US012796609B2

(12) United States Patent
Clark et al.

(10) Patent No.: US 12,796,609 B2
(45) Date of Patent: *Nov. 17, 2026

(54) PROACTIVE VARIABLE CONTROL OF HARVESTER HEADER POSITIONING

(71) Applicant: DEERE & COMPANY, Moline, IL (US)

(72) Inventors: Scott N. Clark, Bettendorf, IA (US); Ashraf Qadir, Ankeny, IA (US); Anand Yogendra Pathak, West Des Moines, IA (US)

(73) Assignee: Deere & Company, Moline, IL (US)

( * ) Notice: Subject to any disclaimer, the term of this patent is extended or adjusted under 35 U.S.C. 154(b) by 296 days.

This patent is subject to a terminal disclaimer.

(21) Appl. No.: 18/529,407

(22) Filed: Dec. 5, 2023

(65) Prior Publication Data

US 2025/0176464 A1 Jun. 5, 2025

(51) Int. Cl.
*A01D 41/14* (2006.01)

(52) U.S. Cl.
CPC ......... *A01D 41/141* (2013.01); *A01D 41/145* (2013.01)

(58) Field of Classification Search
CPC ............................ A01D 41/141; A01D 41/145
USPC .......................................................... 700/275
See application file for complete search history.

(56) References Cited

U.S. PATENT DOCUMENTS

| | | | |
|---|---|---|---|
| 10,757,859 B2 | 9/2020 | Dima et al. | |
| 11,483,972 B2 | 11/2022 | Dima et al. | |
| 11,596,102 B2 | 3/2023 | Neitemeier et al. | |
| 11,659,787 B2 | 5/2023 | Missotten et al. | |
| 2017/0013777 A1* | 1/2017 | Posselius ............. | A01D 41/141 |
| 2019/0327892 A1 | 10/2019 | Fries et al. | |
| 2021/0029878 A1 | 2/2021 | Vandike et al. | |
| 2021/0185918 A1* | 6/2021 | Hunt .................... | A01D 41/141 |
| 2021/0243954 A1 | 8/2021 | Honeyman et al. | |
| 2022/0117158 A1* | 4/2022 | Lamprecht ............. | A01B 79/02 |
| 2023/0062392 A1* | 3/2023 | Brokaw ............... | A01D 41/141 |
| 2024/0407285 A1* | 12/2024 | Ingalls ................. | G06V 20/188 |

* cited by examiner

*Primary Examiner* — Md Abul Azad
(74) *Attorney, Agent, or Firm* — Taft Stettinius & Hollister LLP; Stephen F. Rost

(57) ABSTRACT

A header control system that utilizes an optical sensor to capture information that includes at least a portion of a header of an agricultural vehicle. A controller utilizes object classification to identify, without reliance on fiducial markers, objects in the captured information, including at least a portion of the header. The position of the identified portion of the header can be determined relative to at least one attribute of an upstream crop material or of a ground surface of a field, as may be indicated by information from a terrain map. The identified relative location information is used by the controller to proactively identify and implement adjustments for control settings for the header, including positioning of a reel of the header, as the agricultural vehicle performs operations along the field.

20 Claims, 9 Drawing Sheets

PROACTIVE VARIABLE CONTROL OF HARVESTER HEADER POSITIONING

FIELD OF THE DISCLOSURE

The present disclosure generally relates to systems and methods for controlling a position of at least a portion of a header of a harvester and, more specifically, proactive variable control of the position of a reel of a harvester.

BACKGROUND

Agricultural harvesters, such as, for example, combine harvesters, can include different portions or sections for cutting and processing crops. For example, certain types of combine harvesters include a cutting platform such as an auger platform, draper header, corn header, or row header, among others, that is arranged to be moved in at least a forward direction over a field. A draper header can include a reel that transports cut crop material that is cut by a cutting bar of the header to a plurality of draper belts of the draper header. The draper belts can then transport the collected crop material laterally inwardly and rearwardly to a feederhouse of the harvester for processing by the harvester. A corn header can include several crop dividers, each crop divider defining a channel to direct stalks of a crop material, namely corn, to a row unit. The row unit can include a gathering chain, deck plates, and stalk rolls configured to separate corn ears from the stalk. Further, the separated corn ears are moved to a floor of the corn header, where an auger located above the floor can move the corn ears to a location for collection. Additionally, a crop gather device, such as a reel, can be positioned above the row units to direct lodged crop to the auger bed area for conveyance to the machine.

SUMMARY

The present disclosure may comprise one or more of the following features and combinations thereof.

In one embodiment of the present disclosure, a system is provided for adjusting a position of at least a portion of a header of an agricultural vehicle. The system can include at least one optical sensor positioned to obtain captured information of the header, at least one processor, and a memory device coupled to the at least one processor. The memory device can include instructions that when executed by the at least one processor cause the at least one processor to classify one or more features detected in the captured information without use of fiducial markers to identify one or more objects represented in the captured information, the one or more objects comprising at least a portion of the header. The memory device can further include instructions that when executed by the at least one processor cause the at least one processor to determine, using at least the captured information, a position of the portion of the header relative to at least one attribute of an upstream crop material or a ground surface of a field upon which the agricultural vehicle performs an agricultural operation. Additionally, the memory device can further include instructions that when executed by the at least one processor cause the at least one processor to determine, for a location upstream of the agricultural vehicle, a variance in a position of at least the portion of the header relative to a position of the at least one attribute of the upstream crop material or the ground surface. Additionally, the memory device can further include instructions that when executed by the at least one processor cause the at least one processor to determine, based on the variance, one or more adjusted control settings to adjust the position of the portion of the header relative to the position of the at least one attribute of the upstream crop material or the ground surface, and adjust, based on the one or more adjusted control settings, the position of the portion of the header before, or upon, the header being displaced to a location at which the header encounters the variance in the at least one attribute of the upstream crop material the ground surface.

In another embodiment, a method is provided for adjusting a position of at least a portion of a header of an agricultural vehicle. The method can include capturing, by at least one optical sensor, captured information of the header and a crop material positioned upstream of the agricultural vehicle and classifying one or more features identified in the captured information without use of a fiducial marker to identify one or more objects represented in the captured information, the one or more objects comprising at least a portion of the header. Additionally, using at least the captured information, a position can be determined for the one or more objects relative to a first coordinate system, and the position of at least the portion of the header can be determined relative to a position of at least one attribute of an upstream crop material or a ground surface of a field upon which the agricultural vehicle performs an agricultural operation. Based on the variance, one or more adjusted control settings can be determined to adjust the position of the portion of the header relative to the position of the at least one attribute of the upstream crop material or the ground surface. Additionally, based on the one or more adjusted control settings, the position of the portion of the header before, or upon, the header being displaced to a location at which the header encounters the variance in the at least one attribute of the upstream crop material or the ground surface.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
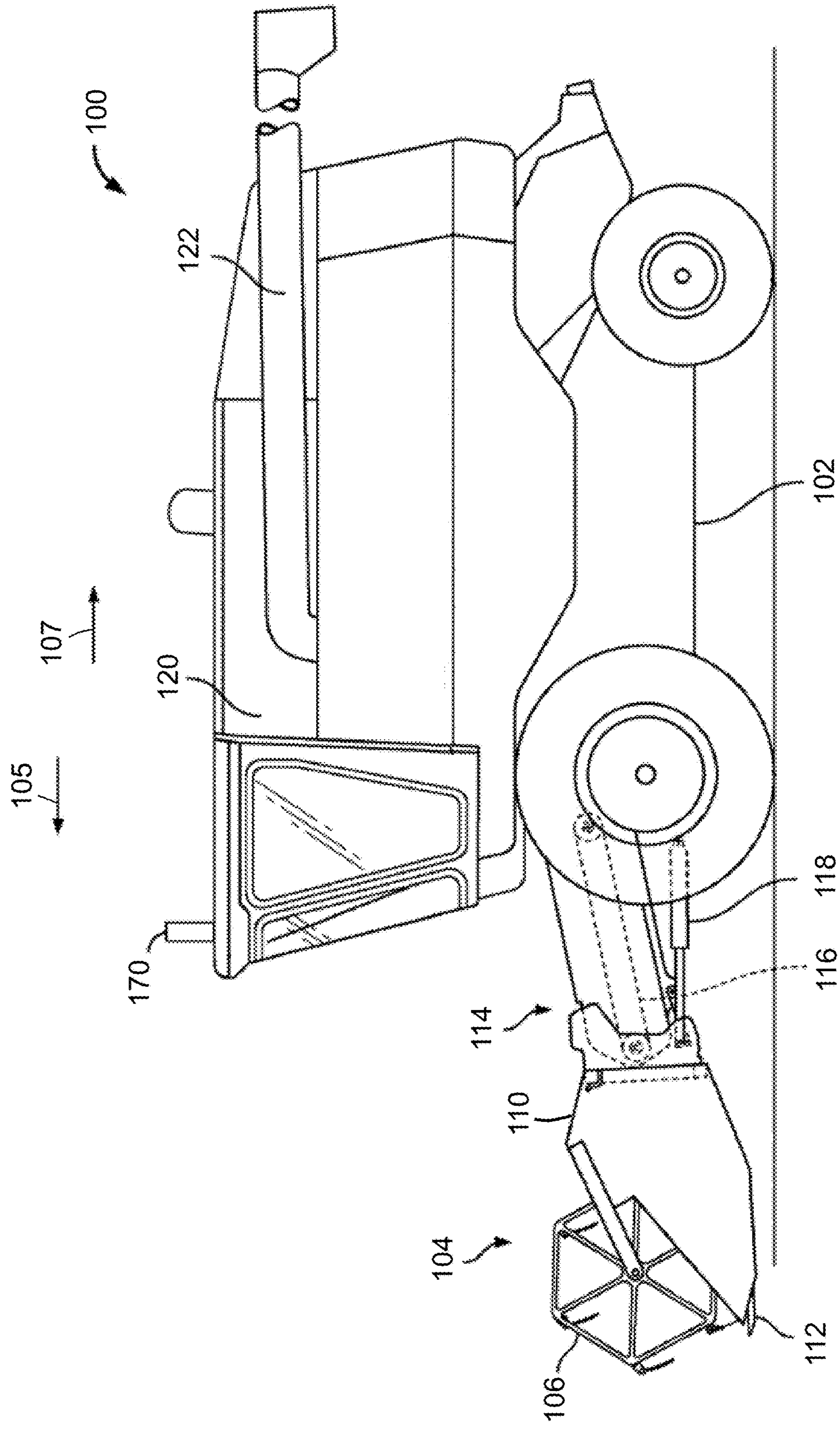
FIG. 1 illustrates a side view of an exemplary agricultural vehicle.
Figure 2:
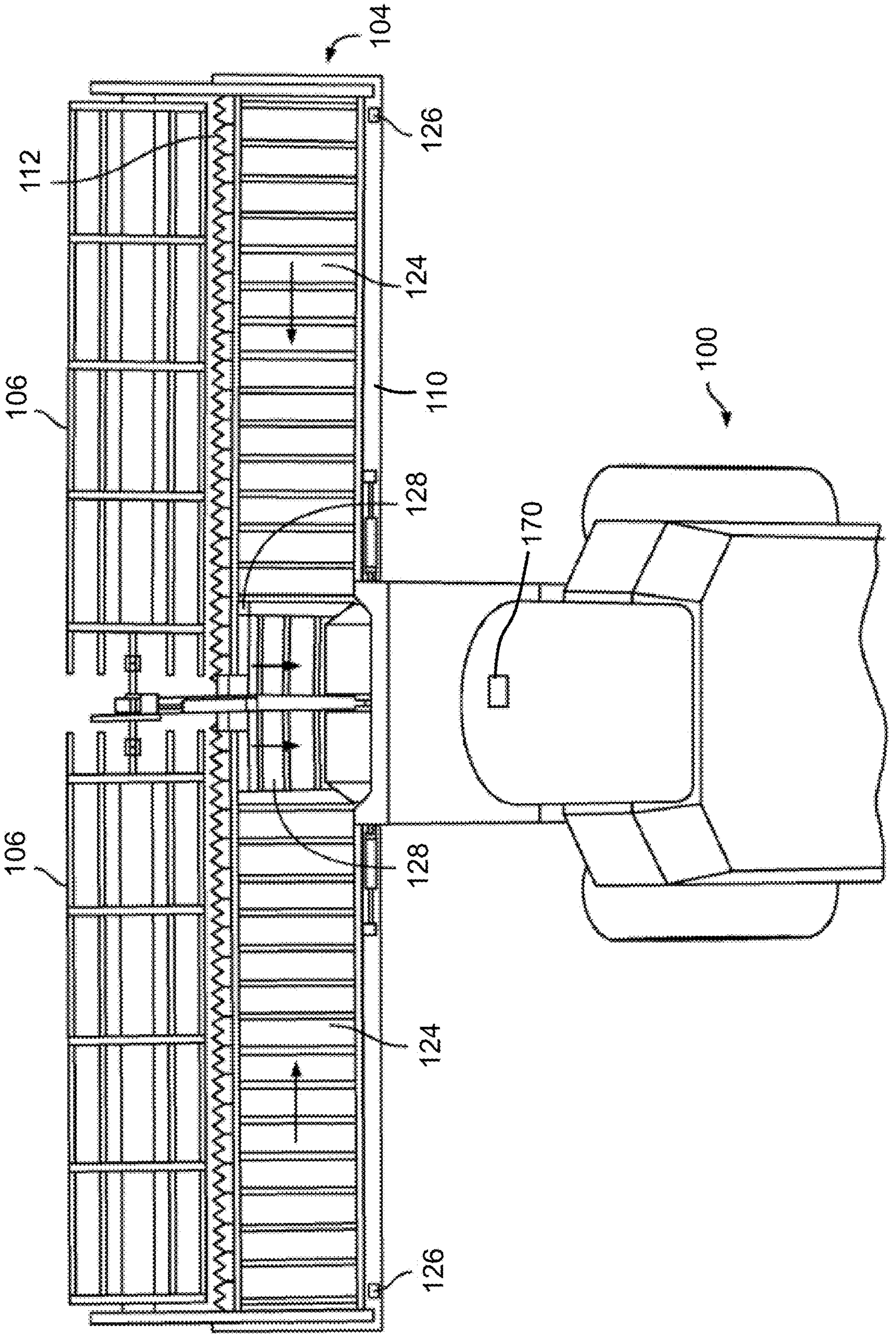
FIG. 2 illustrates a top view of a front portion of the agricultural vehicle shown in FIG. 1.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

FIG. 1 illustrates a side view of an agricultural vehicle 100 in the form of a combine harvester that is coupled to a header 104. While FIG. 1 illustrates a particular example of an agricultural vehicle 100, a variety of other types of agricultural machines and vehicles can be utilized as the agricultural vehicle 100, including, but not limited to, forge harvesters and windrowers, among others. Further, the illustrated agricultural vehicle 100 can be movable, among other directions, in both the forward direction and the rearward direction, as indicated by arrows 105, 107, respectively, shown in FIG. 1. Thus, the agricultural vehicle can move forwardly as the agricultural vehicle 100 is harvesting crop material. as well as moveable rearwardly to be selectively movable out of, or away from, crop material.

Although not shown in FIG. 1, it should be appreciated that the agricultural vehicle 100 at least partially houses a number of devices and/or systems in an interior thereof, such as one or more threshing device(s), separating device(s), and cleaning device(s), for example. Further, the agricultural vehicle 100 at least partially defines a tank 120 that may be used to store cleaned crop materials (e.g., grain) prior to removal and unloading onto a transport vehicle by an unloading conveyor 122.

The agricultural vehicle 100 depicted in FIG. 1 is shown as having an exemplary header 104 in the form of a draper belt header. However, the agricultural vehicle 100 can have a variety of other types of headers 104, including, but not limited to, corn headers. The exemplary header 104 is coupled to a chassis 102 and positioned to remove crop material from the ground during use of the agricultural vehicle 100. Moreover, the illustrated header 104 includes a reel 106 to draw crop material that is cut by a cutter bar 112 of the header into the header 104. As discussed below, the reel 106 is selectively movable relative to a frame or bearing frame 110 of the header 104, including during use of the agricultural vehicle 100.

The header 104 can also be moveable relative to the ground surface to adjust a vertical height of the header, also referred to as header height. For example, according to certain embodiments, the header 104 is pivotable by an actuator 118 relative to the chassis 102 about an axis which extends horizontally and transversely to the forward direction indicated by arrow 105. In some embodiments, the axis may coincide with a rotational axis of an upper guide roller of the central belt conveyor 116 of the header 104 to be able to modify the height of the header 104 above the ground.

The header 104 is configured to direct cut crop material to a feederhouse 114. Moreover, the header 104 can include one or more conveyors or augers, as well as a combination thereof, to convey crop material, and, more particularly cut crop material, along the header 104 and to the feederhouse 114. For example, the exemplary header 104 shown in at least FIG. 1 includes two outer belt conveyors 124 that are each connected to a driver 126 that provides power for the rotational displacement of the drives outer belt conveyors 124. Accordingly, during harvesting of crop material, the power provide by the driver 126 can be transmitted to the each of the two outer belt conveyors 124 such that the top sides of the belts of the outer belt conveyors 124 move inwardly (i.e., as shown by the arrows) so as to convey crop material captured by the reel 106 and severed by the cutter bar 112 to the center of the header 104. Crop material conveyed to the center of the header 104 is then conveyed on a belt of the central belt conveyor 116 that is driven by a driver 128 and transported rearwardly into the feederhouse 114.

Figure 3:
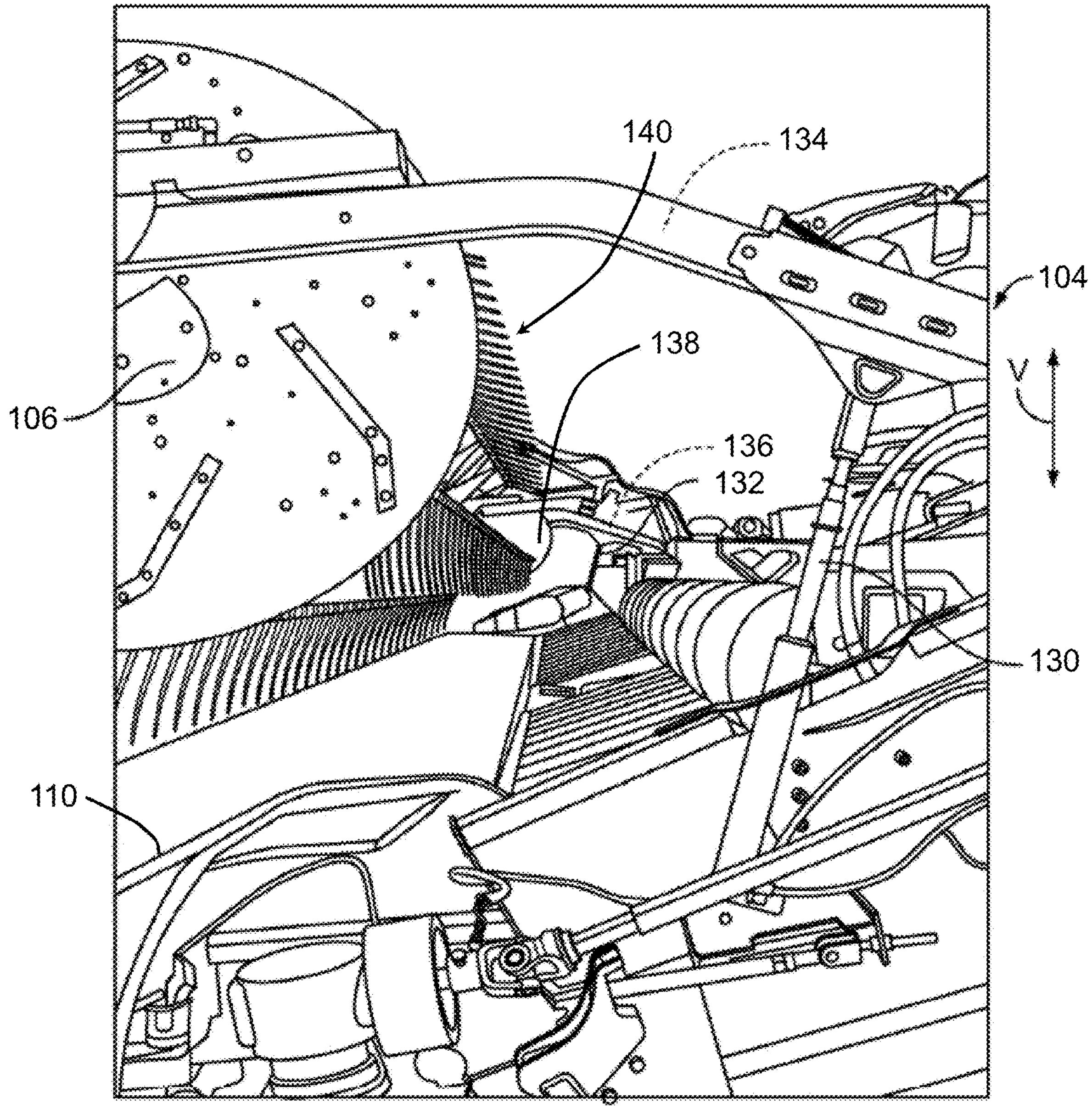
FIG. 3 illustrates a side elevation view of a plurality of actuators of an exemplary header for the agricultural vehicle shown in FIG. 1.

In at least certain circumstances, the position of the header 104 or the reel 106 can be adjusted to accommodate for variances in either, or both, the elevation of the associated terrain or attributes, including characteristics or properties, of the crop material, such as, for example, the height of the crop or crop posture. Moreover, regardless of the type of header 104 utilized, in at least efforts to improve the efficiency in the operation of the header 104, and corresponding crop yield, the header 104, or associated components thereof, is/are often at a select position(s) relative to either, or both, the adjacent ground surface or an attribute of the crop material, including, for example, crop height. However, the elevation of the ground surface, or associated crop attribute, as well as soil types, moisture levels, and nutrients, among other characteristics, can vary across a field, which can, if not properly addressed, adversely impact the crop yield gathered via operation of the header. Therefore, referencing FIG. 3, according to the exemplary illustrated embodiment of the header 104, the reel 106 can be displaced relative to a frame 110 of the header 104 via operation of one or more actuators 130, 132, 134, 136. A variety of different types of devices, as well as combinations of devices, can be utilized for the actuators 130, 132, 134, 136, including, for example, electrically driven linear actuators, a pneumatic actuator, or another hydraulically operated actuators, as well as combinations thereof, among other devices. Thus, for example, one or more of the actuators 130, 132, 134, 136 can be a double-acting hydraulic or pneumatic cylinder that is extendable and retractable to vary a length thereof. Such actuators 130, 132, 134, 136 can thus further include one or more associated pumps, motors, or control valves, as well as various combinations thereof, among other devices, that are utilized in controlling the selective extension and retraction of such cylinders 130, 132, 134, 136. Additionally, while the embodiment depicted in FIG. 3 illustrates four actuators 130, 132, 134, 136, the number of actuators can vary.

Figure 4A:
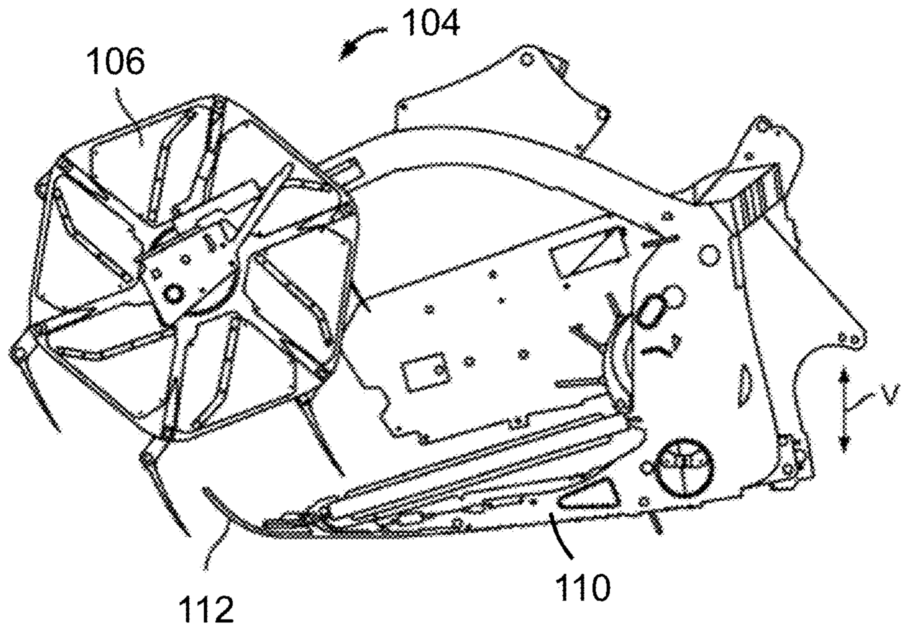
FIGS. 4A, 4B, 4C, and 4D illustrate sectional views of the exemplary header shown in FIG. 3 with a reel of the header in a harvest position, raised position, rearward position, and lowered position, respectively.
Figure 4B:
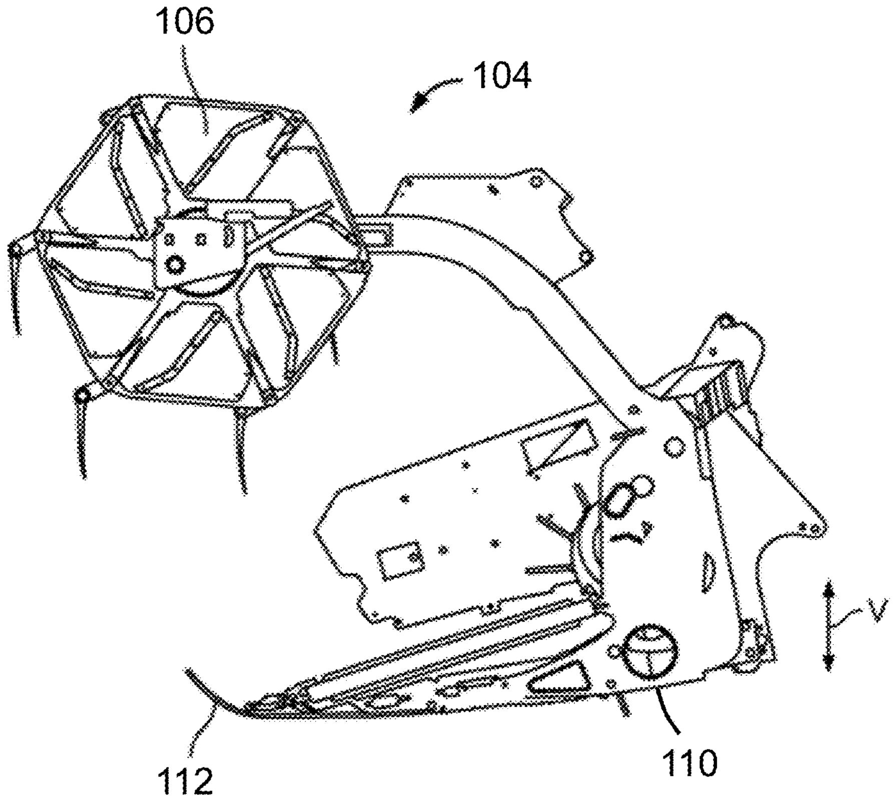
Figure 4C:
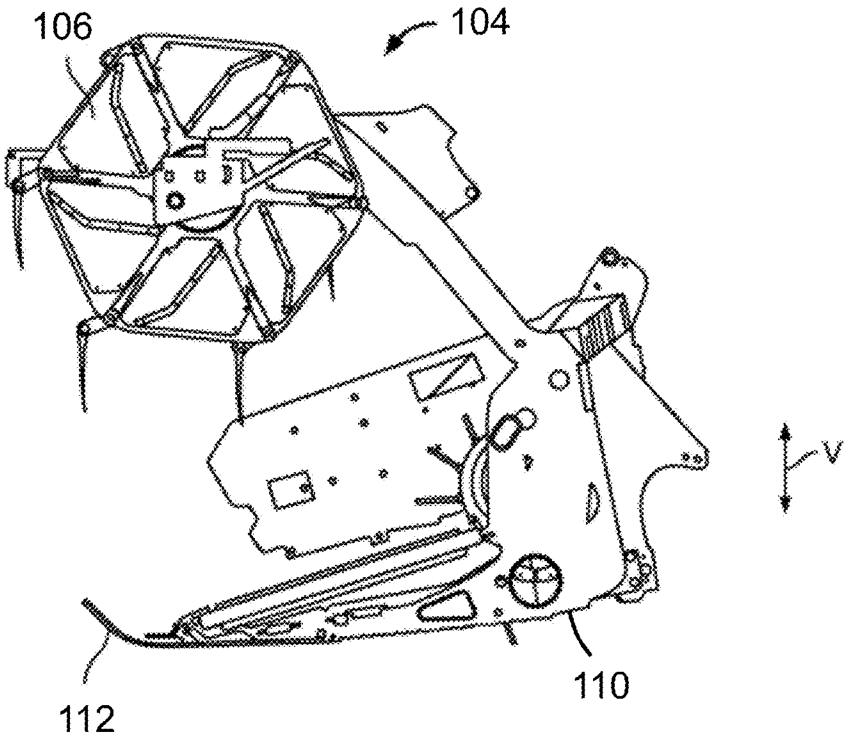
Figure 4D:
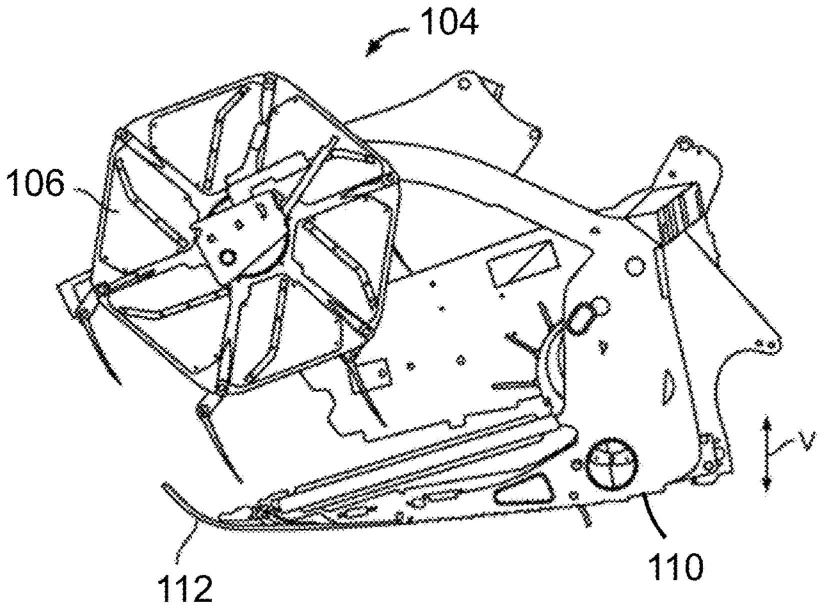

In the illustrated embodiments, the one or more of the actuators 130, 132, can be selectively actuated to be extendable and retractable in a manner that can cooperatively vertically displace (as generally indicated in at least FIG. 3 as by the arrow labeled "V") the reel 106 upwardly and downwardly relative to the frame 110. Additionally, at least some of the actuators 134, 136 can be extendable and retractable to adjust a longitudinal position of the reel 106, such as, for example, move the reel 106 in a generally forward and rearward directions to adjust the longitudinal position of the reel 106, including, for example, the fore/aft position of the reel 106. For example, FIG. 4A illustrates the reel 106 positioned in harvest position at which the reel 106 is in relatively close proximity to the cutter bar 112 and the ground. Thus, in such an exemplary harvest position, the reel 106 is positioned to draw crop material severed from the ground by the cutter bar 112 into the header 104. However, as previously mentioned, either or both the vertical position or longitudinal position (e.g., fore/aft position) of the reel 106 can be adjusted to accommodate variances relating to the terrain or attributes of the crop material. Thus, for example, relative to the harvest position of the exemplary reel 106 shown in FIG. 4A, the reel 106 can be vertically displaced to a raised position, as shown in FIG. 4B. Additionally, the raised reel 106 can be moved reward from the raised position shown in FIG. 4B to a rearward position, as shown in FIG. 4C, thereby adjusting the fore/aft position of the reel 106. Further, the reel 106 shown in FIG. 4C can be vertically displaced from the rearward position shown in FIG. 4C to a lowered position, as illustrated in FIG. 4D. While reference is made above to specific positions, namely the harvest, raised, rearward, and lowered positions, the reel 106, including the associated actuators 130, 132, 134, 136, can be configured for the reel 106 to be displaced to a variety of other positions, including with respect to either, or both, the vertical or fore/aft position of the reel 106. Further, while the illustrated example is discussed in terms of the displacement or positioning of the reel 106, the vertical or fore/after positions of the header 104 or other components of the header 104 can be similarly displaced in similar manners.

Figure 5:
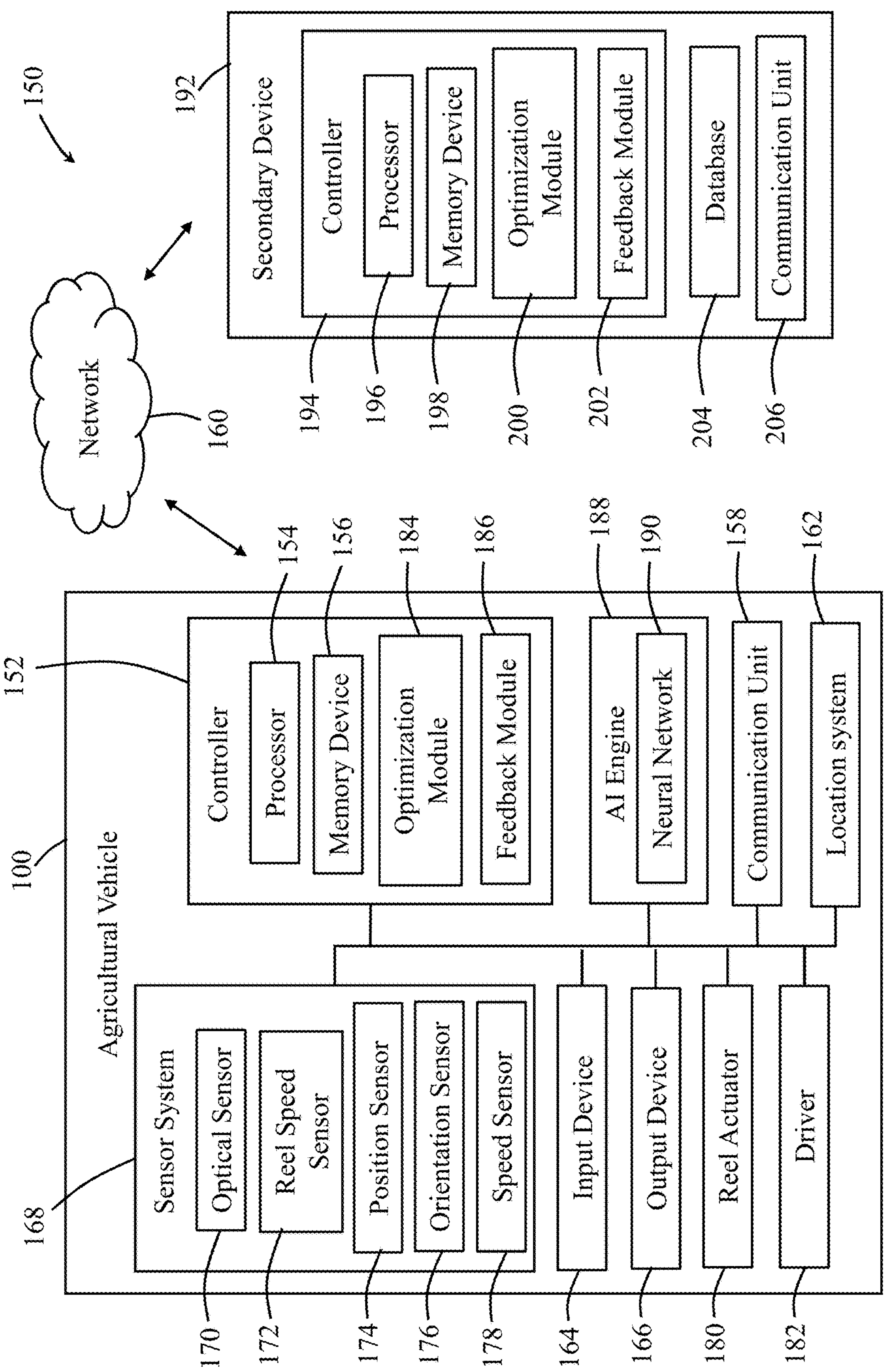
FIG. 5 illustrates a block diagram of an exemplary header control system configured for proactive displacement of a position of a header or one or more components of the header.

FIG. 5 illustrates a block diagram of an exemplary header control system 150 configured for proactive displacement of a position of the header 104, or of one or more components of the header 104. The header control system 150 can include both the agricultural machine 100, or components thereof, and information stored, derived, or developed by a secondary device 192, including, but not limited to, a cloud-based database. Both the agricultural vehicle 100 and the secondary device 192 can each include one or more controllers 152, 194. The controllers 152, 194 can each include one or more processors 154, 196 that can follow instructions, including control instructions, contained on one or more associated memory devices 156, 198, including, for example, a non-transitory machine-readable medium. As discussed below, the controller 152, 194 can, for example, be utilized to generate commands based on either or both control settings determined or stored by the controller 152, 194, or inputted by an operator of the agricultural vehicle 100 to operate one or more actuators 180 to at least adjust a position of the header 104, or one or more components of the header 104. Thus, with respect to the exemplary header 104 discussed above, the actuator 180 shown in FIG. 5 can correspond to one or more, if not all, of the actuators 118, 130, 132, 134, 136 discussed above with respect to the illustrated header 104 and reel 106, among other actuators associated with other components of the header 104. Additionally, at least the controller 152 of the agricultural vehicle 100 can also be configured to generate one or more signals to control an operation of one or more drivers 182 of the header 104, including, for example, one or more drivers 126, 128 associated with the above-discussed conveyors 118, 124.

The agricultural vehicle 100 and the secondary device 192 can also each include a communication unit 158, 206 that can accommodate the communication of information, including, for example, a terrain map having ground terrain and coordinate information stored in a database 206 of the secondary device 192, between the agricultural vehicle 100 and the secondary device 192, among other systems, components, devices, equipment, or machinery. The communication units 158, 206 can be configured for either, or both, wired or wireless communications, including, for example, via proprietary and non-proprietary wireless communication protocols. For example, the communication units 158, 206 can be configured to accommodate Wi-Fi, ZigBee, Bluetooth, radio, cellular, or near-field communications, among other communications that use other communication protocols, including, but not limited to, communications over a wireless network 160, such as, for example internet, cellular, and/or Wi-Fi networks, as well as combinations thereof. According to certain embodiments, the communication units 158, 206 can each comprise a transceiver.

The agricultural vehicle 100 can also include a location system 162, such as, for example, a global navigation satellite system, including, but not limited to, a global positioning system (GPS). The location system 162 can be operated to provide a detailed indication of the location of the agricultural vehicle 100, particularly as the agricultural vehicle 100 traverses across a field. According to certain embodiments, the location system 162 can include a receiver that can receive information from an external source that can indicate the location of the agricultural vehicle 100, including, for example, via location coordinates.

The agricultural vehicle 100 can further include one or more input devices 164, such as, for example, one or more keyboards, keypads, touch screens, mouse, buttons, joysticks, switches, or mobile personal computing devices, such as, for example, mobile phones, smart phones, or tablets, as well as combinations thereof, among other types of input devices 164. Such input devices 164 can be configured to receive information, commands, or instructions inputted by an operator of the agricultural vehicle 100. Summarily, the agricultural vehicle 100 can include one or more output devices 166, including, for example, one or more displays or touchscreens, among other types of output devices. Further the input device 164 and the output device 166 can either, or both, be local to, and remote from, the agricultural vehicle 100.

The agricultural vehicle 100 or header control system 150 can also include an onboard sensor system 168 that can include one or more optical sensors 170. A variety of different types of optical detection devices can be utilized for the optical sensor 170, including, but not limited to, stereo depth cameras, stereo sensors, RGBD (red, green, blue, depth) cameras, three-dimensional sensors, LIDAR, radar, and three-dimensional cameras, as well as combinations thereof, among other types of sensors. The optical sensor 188 can capture information in one or more images or videos of at least a portion of the header 104, including, for example the reel 106, among other portions of the header 104, and at least a portion of crop material in front of the header 104. As discussed below, according to such an embodiment, the controller 152 of the agricultural machine 100, or other controller associated with the sensor system 168 or optical sensor 180, can be configured to at least assist in the evaluation of such captured information from the optical sensor 188, such as, for example, on a pixel level, or based on a collection or area(s) of pixels, among other bases for evaluation. Such an evaluation can be based, for example, at least in part, on either or both a color or level of light present or not present in an area(s) or pixels in the captured information, as well as associated depth information. As discussed below, such evaluation can involve object classification, which can, for example, be performed on a pixel level. Moreover, according to certain embodiments, such evaluation of the captured information can include associating particular pixels from the image(s) or video(s) with a particular object that is anticipated to be present in the captured information, such as, for example, a central tube 138 of the reel 106, at least some of the reel fingers 140 that extend from the central tube 138, as shown in FIG. 3, or crop material, as well as combinations thereof, among other objects.

The sensor system 168 can further include one or more reel speed sensors 172 that can be associated with the reel 106 or a motor utilized to provide power for rotational displacement of the reel 106, among other associated rotating elements of the reel 106. For example, according to certain embodiments, the reel speed sensor 172 can provide an indication of a rotational speed of the tube 138 of the reel 106 to which fingers 140 of the reel 106 are coupled. The reel speed sensor 172 can be a known type of sensor that senses speed by magnetic or optical targets that rotate with the reel 106, motor, or other rotating element of the reel 106 that are sensed by a stationary sensor. The controller 152 can generate one or more signals to control the operation of an associated actuator, such as, for example, a speed and direction of rotation of a motor of the reel 106, or operation of an associated pump and control valve, to control the speed and direction of rotation of the reel 106. Further, either or both the controller 152 or an operator of the agricultural vehicle 100 can adjust the speed of the reel 106 based on a variety of criteria or control settings, including, for example, based on one or more attributes, including characteristics or properties, of the crop material, including, for example, crop type, crop height, or crop posture, among other attributes, as well as combinations thereof. Moreover, the speed at which the reel is rotating, as indicated by the reel speed sensor 172, can be indicated to the operator via the output device 166, and selectively adjusted by the operator via one or more commands inputted by the operator via the input device 164.

The illustrated sensor system 168 can further include one or more position sensors 174 that are configured to sense the position of the header 104, reel 106, cutter bar 112, or other front-end equipment relative to the frame 110 of agricultural harvester 100. For instance, one or more sensors 174 may sense the height of header 104 above the ground. Further, one or more of the position sensors 174 can provide information indicating a vertical position of the reel 106, or other components of the header 104, relative to the ground or other portions of the header 104. Additionally, or alternatively, one or more position sensors 174 can be utilized to provide information regarding the fore/aft position of the reel 106, including with respect to the header 104 or other portion of the agricultural vehicle 100. Further, according to certain embodiments, a position sensor 174 can provide information indicative of an elevation of the reel 106 with respect to the at least one support element of the header 104, which can assist in determining the position of the reel 106, central tube 138 of the reel 106, or fingers 140 of the reel 106. Moreover, knowledge relating to the position of the central tube 138 and dimensions or geometric configuration of the fingers 140 can be utilized to determine a location of the fingers 140. Such information, as well as information relating the crop attributes, including crop height, or the relative location of the ground can be used to determine the extent the fingers 140 extend into the crop material or proximity of the fingers 140 to the ground surface.

The sensor system 168 can also include one or more orientation sensors 176. According to certain embodiments, at least one orientation sensor 176 can provide an indication of an orientation, including, for example, a tilt angle, of one or more portions of the header 104 relative to other portions of the header 104, agricultural vehicle 100, crop material, or ground. Thus, such information can be used in connection with determining relative positions of the header 104 or reel 106, among other components of the header 104, including the reel 106, as the slope of the terrain changes across a width or length of the header 104, including along a direction that is generally perpendicular to a direction of forward travel of the agricultural vehicle 100.

According to certain embodiments, the sensor system 168 can further include one or more ground speed sensors 178 that can sense a travel speed of the agricultural vehicle 100 over the ground. A variety of different types of sensors can be utilized as the ground speed sensor(s) 178, including, for example, a sensor(s) that senses a rotational speed of ground engagement bodies of the agricultural vehicle 100, such as, for example, one or more wheels, or an associated drive shaft or axel, among other components associate with driving movement of the agricultural vehicle 100 along the field. Additionally, or alternatively, the travel speed of the agricultural vehicle 100 can be based on changes in positional information for the agricultural vehicle 100, or portions thereof, as determined using information provided by the location system 162, including changes in GPS coordinates over an identified time.

One or both of the controllers 152, 194 of the agricultural vehicle 100 or the secondary device 192 can also include a machine learning optimization module 184 that can adjust one or more control settings for the header 104, or components of the header 104, such as, for example, the reel 106. For example, as discussed below, the optimization module 184 can generate control settings that can be used to generate signals to adjust one or more of a height of the header 104, a height of the reel 106, or a fore/aft position of the reel 106, among other header 104 components. Such control settings can be derived, and updated, via use of at least the optimization module 184 based on one or more models, including algorithms, and input information that can include information provided by, or derived from, the sensor system 168, a terrain map, and a feedback module 186, 202, among other input information. According to certain embodiments, such machine learning for either or both the development or refinement of the model(s), including algorithms, used by the optimization module 184 can be performed online at the agricultural vehicle 100, including via training of a neural network 190 of an artificial intelligence (AI) engine 188. Additionally, or alternatively, the optimization module 200 can be located at the secondary device 192, and the secondary device 192 therefore include the neural network 190 and artificial AI engine 188. Further, the feedback module 186, 202, which can be located at either or both the agricultural vehicle 100 or the secondary device 192, can include a recording of adjustments made by an operator to the control settings communicated by, or from, the optimization module 184, 202, as further discussed below. The feedback module(s) 186, 202 can include, among other information, information indicating the extent of the adjustment(s) or resulting setting(s) from such adjustment(s), among other information, that an operator manually inputted to the implementation of one or more of the control settings.

Figure 6:
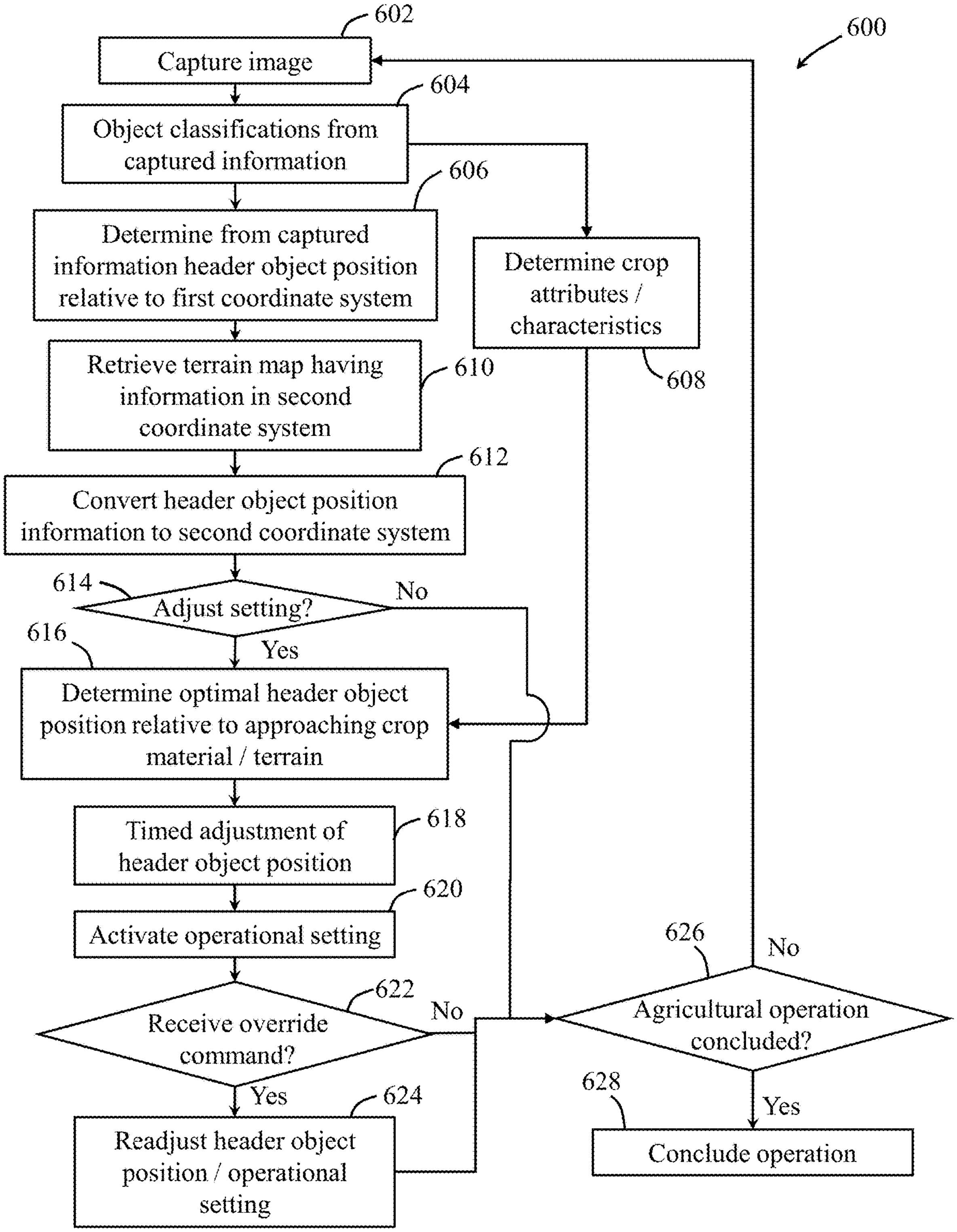
FIG. 6 illustrates a simplified flow diagram of an exemplary method for adjusting a position of at least a portion of a header of an agricultural vehicle.

FIG. 6 illustrates a simplified flow diagram of an exemplary method 600 for adjusting a position of a at least a portion of the header 104 of the agricultural vehicle 100. The method 600 is described below in the context of being carried out by the illustrated exemplary header control system 150. However, it should be appreciated that method 600 can likewise be carried out by any of the other described implementations, as well as variations thereof. Further, the method 600 corresponds to, or is otherwise associated with, performance of the blocks described below in the illustrative sequence of FIG. 6. It should be appreciated, however, that the method 600 can be performed in one or more sequences different from the illustrative sequence. Additionally, one or more of the blocks mentioned below may not be performed, and the method 600 can include steps or processes other than those discussed below.

At block 602, one or more of the optical sensors 170 can be operated to capture information in the form of one or more at least partially forward-directed images, including, for example, one or more photographs or videos, as well as combinations thereof. The captured information can include at least a portion of the header 104, including, for example, the real 106, as well as crop material that is positioned ahead of the header 104, which can collectively be referred to herein as objects. Moreover, the crop material captured in the captured information can include not only crop material that is generally directly adjacent to the header 104, but also crop material that is located upstream of the direction of travel of the header 104. Further, according to embodiments in which the optical sensor 170 is one or more stereo cameras, including red, green, and blue (RGB) stereo cameras, the captured information can include colors, shading, and depth or distance information relating to the objects captured in the captured information obtained by the optical sensor(s) 168.

At block 604, the captured information can be analyzed by the controller 152, including, for example, by a machine learning classification algorithm, also referred to herein as a classifier, to associate information from the captured information with one or more particular objects. According to certain embodiments, such object classification can occur at a pixel level. Such classification of objects in the captured information can involve, at least in part, an analysis of the color, brightness/darkness, shading, texture, patterns, depth information, and location of individual pixels or groups of pixels in the captured information. Further, such classification can be aided via use of known relative locations, coordinates, and geometric sizes and shapes of objects that are anticipated to be represented or otherwise captured in the captured information. Additionally, information from the sensor system 168, including information provided by one or more of the reel speed sensors 172, position sensor 174, and orientation sensor 176, as well as lookup table information stored by the memory device 156, can provide actual position/speed feedback information that can be utilized to further assist with classification of objects from the captured information.

Such classification of the captured information can at least assist in identifying the position and location of the header 104, or certain components of the header 104, including, for example, the central tube 138 of the reel 106. Additionally, captured information obtained by the optical sensor 170 at different times, or by other optical sensors 170, can be compared in connection with identifying a particular object, as well as a position of that object, in the captured information. Such object classification by the classifier can also be used to derive information relating to particular attributes, including characteristics or properties, of the crop material that the header 104 is, or will be, encountering.

The classifier, and, more specifically, the machine learning classification algorithm, can be configured to detect objects within the captured information in the absence of such objects having fiducial markers, or related props, including optical markers, that may otherwise traditionally be utilized or added to items for the purpose of assisting in visual detection or recognition of an object. Such object detection without fiducial markers can also involve determining a position of the detected object within a first coordinate system, such as, for example, a vehicle coordinate system, as discussed below. For example, according to certain embodiments, the classifier can identify the central tube 138 of the reel 106, among other portions of the reel 106 and header 104, without reliance on the presence, or detection, of fiducial markers on the central tube 138 or other portions of the reel 106 or header 104. As discussed below, such markerless detection of at least portions of the reel 106 or header 104, or both, as well as an associated determination of the location of those detected objects can be utilized in subsequent determinations of the position, including, for example, vertical height, of the reel 106 and the header 104 relative to either or both the upstream crop material (i.e., crop canopies) or the ground, as may be identified by at least a terrain map or sensors, among other sources of information.

For example, such object classification can, as discussed below, be utilized to determine a crop height, crop color, texture, or crop posture, as well as combinations thereof, among other crop material information. Such information, or certain aspects of such information, can also, or alternatively, be provided from other sources. For example, additionally, or alternatively, crop canopy information, including crop height, can be provided, or derived using information, from a three-dimensional (3D) point cloud and scrolling map generation, and, moreover, be provided in the form of a 3D point cloud from stereo cameras, among other optical sensors 170, and terrain profiles from a GPS or terrain map. Further, crop posture information can provide an indication of an orientation of the crop relative to the ground, including, for example, whether the crop is standing, or lodged, among other orientations. As discussed below, such crop posture and height information can be utilized, along with other information, by the header control system 150 to determine a position or orientation of the header 104 or one or more components of the header 104, including, for example, the reel 106 or cutting bar 112, among other components, as well as operational settings for such components, including a speed at which the reel 106 is to rotate.

According to certain embodiments, a version, such as, for example, a software version, of the classifier can be maintained at the agricultural vehicle 100, including, for example, by or at the controller 152. However, the classifier can be machine learnable such that one or more models, including algorithms, of the classifier can be updated and refined offline, such as, for example, at the secondary device 192, using at least data generated during operation of the header 104 or while the agricultural vehicle 100 is performing a harvesting operation, as well as based on operator feedback. Thus, for example, information, including data, collected or derived via the operation of the agricultural vehicle 100, including, for example, by either or both one or more sensors of the sensor system 168 or the classifier at the agricultural vehicle 100, among other information, can be communicated from the agricultural vehicle 100 to the secondary device 192 as feedback information. Such feedback information provided to the classifier at the secondary device 192 can be utilized by the secondary device 192 to evaluate the accuracy of the information being determined by the classifier at least at the agricultural vehicle 100. Moreover, discrepancies between object classifications generated by the classifier at the agricultural vehicle 100 and the feedback information communicated to the secondary device 192 can be used to identify, or further refine, patterns used in connection with the machine learning of the classifier. Further, updates or refinements in the classifier that are developed via machine learning at the secondary device 192 can at least periodically be communicated from the secondary device 192 to the agricultural vehicle 100 via the associated communication units 158, 206 and network 160 in the form of a software update for the classifier at the agricultural vehicle 100.

Using the information provided by the one or more optical sensors 170 at block 602, and the object classifications, including classifications derived via the markerless detection of components of the reel 106 or header 104, from block 604, at block 606 the controller 152 can determine position information for the header 104, or components thereof, relative to a first coordinate system. For example, according to certain embodiments, at block 606, the controller 152, including, via the processor 154 executing one or more instructions contained on the memory device 156, can identify at least one of a position, location, and height of the central tube 138 of the real 106 relative to a three-dimensional first coordinate system, including, for example, a camera or sensor coordinate system. Further, such positional information can assist in determining the position of the header 104, or components thereof, relative to at least the crop material. Thus, such a markerless approach can accommodate at least detection of features or characteristics of, or relating to, the header 104, including, for example, positional information of at least certain components of the header 104, without reliance or use of features utilized with traditional marker approaches. Moreover, the markerless approach disclosed herein can identify, or be used to determine, such features or characteristics relating to at least the header 104 without reliance on traditional markers, including, for example, without reliance on detection of characteristics of one or more markers, including the color of such traditional marker(s).

Additionally, the object classifications from block 604, among other information provided by the captured information from block 602, including colors, brightness, and depth information, can be utilized at block 608 to determine attributes, including characteristics or properties, of the crop material captured in the captured information. As previously discussed, such determined attributes of the crop material can include crop height, crop color, texture, orientation, or crop posture, as well as combinations thereof, among other crop material information that can impact the control settings of the header 104, including, for example, the height of the header 104 or reel 106, the fore/aft position of the reel 106, the speed of the reel 106, or the cutting bar 112 position, among other control settings.

At block 610, a terrain map of at least the field, or portion of the field, upon which the agricultural vehicle 100 is, or will be, performing an agricultural operation can be retrieved or received. For example, in at least certain instances, the terrain map can be stored at the agricultural vehicle 100, including, for example, at the memory device 156. Additionally, or alternatively, the terrain map, or an updated version of the terrain map, can be stored at the secondary device 192, including, for example, at the database 204 of the secondary device 192. Thus, to the extent not available at the agricultural vehicle 100, in certain instances, at block 610, the terrain map can be communicated via the communication units 158, 206 and the associated network 160 from the secondary device 192 to the agricultural vehicle 100.

According to certain embodiments, the terrain map can include a variety of information regarding the characteristics of the field, including topography related information. Thus, for example, the terrain map can include information regarding changes in the elevation of the field, including, for example, locations at which the ground surface may be upwardly or downwardly sloped, as well as locations of depressions and protrusions within the field. Additionally, the terrain map can also provide information of internal boundaries regarding potential obstacles located in the field, including, for example, the location of rocks and fences, among other structures and obstacles. Additionally, the terrain map can provide information regarding the particular locations of the various features within, or of, the field. Such location information from the terrain map can be provided in terms of a second three-dimensional coordinate system that is different than the previously mentioned first coordinate system. For example, while the first coordinate system can be based, for example, on a camera or sensor coordinate system, the second coordinate system used with information provided in the terrain map can utilize a location system coordinate system including, for example, a GPS coordinate system. Thus, at block 612, the controller 152 of the agricultural vehicle 100 can convert location information relating to the captured information from the first coordinate system to the second coordinate system. According to certain embodiments, such a conversion can be aided by use of the location system 162 of the agricultural vehicle 100, as well as one or more reference locations or points that may be reflected in the captured information that may have known, or identifiable, locations along both the first and second coordinate systems. Thus, conversion of such known reference locations from the first coordinate system and the second coordinate system, and relative positions of other objects in the capture information to such reference locations, can assist in converting the location of other objects from the first coordinate system to the second coordinate system.

The relative transformation from the first coordinate system to the second coordinate system can be performed, including via operation of the controller 152, in a variety of different manners. For example, according to certain embodiments, such transformation can be performed via use of machine type lookup tables, manual calibrations, or via automated calibration that may, or may not, involve receipt of operator inputs. Alternatively, according to other embodiments, such a transformation from the first coordinate system to the second coordinate system can involve performance, by the controller 152, of active calibration. Such active calibration can include, for example, providing captured information to the controller 152 from the optical sensor 170 or an associated recognition system, that can be used by the controller 152 in establishing thresholds that can be based on highest and lowest setpoint leveraging of the recognition system.

The conversion of information provided by, or derived from, the captured information from at least block 602 to the second coordinate system at block 612 can assist in at least determining current positions of the header 104, or associated components, and crop material relative to at least the adjacent ground. Such information can also be used to determine positions of the header 104, or components thereof, relative to crop material. Additionally, such relative positional information may pertain to current locations or positions of the header 104, or associated components, and either or both adjacent crop material and the ground.

The conversion of captured information from the first coordinate system to the second coordinate system can also be used to derived information regarding the position of the header 104, or components thereof, relative to ground terrain or crop material that are at locations upstream of, or generally remote from, the present location of the header 104 or agricultural vehicle 100. Such a forward-looking approach can be utilized to proactively determine adjustments, if any, that are to be made to the position or operation of the header 104 or associated components in view of identified upstream variances or changes in crop material attributes or ground terrain. Further, such a proactive approach to adjustments for the operation or position of the header 104, or associated components, can be based, at least in part, on efforts to compensate for at least certain latencies of the agricultural vehicle 100. For example, such a proactive approach as to identification of upcoming or upstream variances in ground terrain or crop material attributes, and a determination by the optimization module 184 of the associated adjustments that are to be made to one or more control settings of the header 104, can be made in a manner to allow for time to not only identify the upcoming variance and control setting adjustment(s), but to also allow time for those adjustments to be implement or executed. For example, such a proactive approach can be configured such that as the header 104 approaches, or has reached, the identified variances in terrain or crop material attributes, the changes in the control setting(s) have implemented for the header 104. For example, such a proactive approach can be implemented at block 618 such that changes relating to the height of the header 104 or reel 106, among other positional adjustments, due to identified variances in the elevation of the ground or the height of crop material can be implemented before, or just as, the header 104 reaches those changes in elevation or crop material height.

Further, such adjustments in the control settings can be based on an outcome from the optimization module 184, and can relate to operational adjustments in addition to the positional adjustments made at block 618. For example, based on one or more outcomes from the optimization module 184, the controller 152 can issue one or more signals to change a location of the cutting bar 112, the speed at which the reel 106 rotates, the speed at which the conveyors 116, 124 are being rotated by the corresponding driver 182. Additionally, or alternatively, such changes in one or more operational settings can be based on an identification of a predetermined operational setting when a certain condition is determined or detected, including, for example, a height at which the header 104 or reel 106 is to be positioned, or with respect to an identified crop material attribute, including crop material height, orientation, or posture, among other attributes. By being able to proactively make such changes in the settings of the header 104, or components thereof, throughout a duration of a performance of an agricultural operation about a field, potential loss in crop yield that could otherwise be associated with variations in terrain elevation or crop material height may be minimized, if not eliminated.

The distance in front of the header 104 or agricultural vehicle 100 at which crop material or terrain, and the size of the area of crop material or terrain, that is to be examined in connection with proactive determinations of whether to adjust one or more control settings associated with the header 104 can be based on a variety of different criteria. For example, in certain instances, the distance in front of the header 104 or agricultural vehicle 100 that is to be examined for variances in terrain or crop material, or both, can be at least partially a function of the speed of travel of the agricultural vehicle 100, which can, for example, be determined via use of the speed sensor 178. Thus, for example, when the agricultural vehicle is traveling at a first speed, the crop material or ground terrain being evaluated for the variances that could facilitate a change in the control settings can be at a first distance away from the header 104 or agricultural vehicle 100. However, when the agricultural vehicle 100 is traveling at a second speed that is faster than the first speed, the crop material or ground terrain being evaluated for the variances that could facilitate a change in the control settings can be at a second distance away from the header 104 or agricultural vehicle 100, the second distance being larger than the first distance. The differences in first and second distances can be configured to provide sufficient time for identification of the variance(s) in the terrain or crop material attributes, determination of the appropriate adjustment(s) (if any) in the control setting(s), and implementation of such an adjustment(s), such as, for example, via operation of one or more of the actuators 180. Accordingly, such an approach can seek to have the position or operation of the header 104, or associated components, adjusted at least by the time the header 104 reaches the changing terrain or crop material attributes, as indicated by block 618.

Accordingly, using at least relative position information regarding the header 104, components of the header, ground terrain, or crop material, as well as combinations thereof, as well as information regarding the attributes of the crop material, the optimization module 184 of the agricultural vehicle 100, the controller 152 can determine at block 614 as to whether one or more control settings for the header 104, or components thereof, are to be changed. For example, as previously mentioned, terrain information and one or more attributes of the crop material, including for example, crop height, posture, or orientation, or any combination thereof, as well as the relative position of the heeder 104, or component of the header 104, can be used by the controller 152, including, for example, the optimization module 184, to determine if the height of the header 104, or associated component, is to be changed. Thus, for example, an identification of an upcoming: change in height of the crop material; change in the posture of the crop material; or change in the elevation of the ground, as well as combinations thereof, among other identified approaching variances, can result in the optimization module 184 at block 616 being used to determine one or more adjustments that can adjust, at block 618, the height of the header 104, the height of the cutting bar 112, or the height, fore/aft position, or speed of the reel 106, among other adjustments.

Therefore, if a determination is made by the controller 152 at block 614 that one or more control settings are to be adjusted, such adjustments to the header 104, or associated components, as determined by the optimization module 184, can be automatically implemented at blocks 618 and 620 by one or more signals generated by the controller 152. However, according to certain embodiments, the operator can adjust, or override such changes before, during, or after the controller 152 has communicated one or more signals corresponding to such an adjustment(s) to one or more of the actuators 180. For example, as indicated in FIG. 6, according to certain embodiments, at block 622, the controller 152 can determine whether an override or adjustment signal has been communicated from the operator via a command or signal manually inputted by the operation via use of the input device 164. For example, at block 618, the controller 152 can, in view of a determination made by the optimization module 184 at block 616, generate one or more signals that result in one or more of the actuators 180 adjusting a vertical height or fore/aft position of the reel 106. Similarly, based on the changes to the control settings and preset settings, if any, that may have been provided by the operator, the controller 152 can determine at block 620 to adjust an operational setting of the reel, such as, for example, adjust a speed of rotation of the reel 106. However, the operator can utilize an input device 164 to adjust such adjustments that were, or are to be, automatically implemented. Thus, for example, in response to receipt of one or more override commands or adjustments manually inputted by the operator via use of an input device 164, at block 624 the operator can change the prior automatic adjustment of the vertical height, fore/aft position, or speed of rotation of the reel 106, as well as combinations thereof, to suit the preferences of the operator. Such changes made by the operator can further be recorded by the feedback module 186, 202 and utilized in connection with subsequent offline or online machine learning for the optimization module 184, 200, as discussed below with respect to FIGS. 7 and 8, respectively.

To the extent a determination is made at block 614 that no adjustments are to be made, or that such adjustments are made at blocks 618, 620, or 624, the method 600 can proceed to block 626, where the controller 152 can determine whether the agricultural operation being performed using the agricultural vehicle 100 or header 104 has concluded. If the agricultural operation is determined at block 626 to have concluded, then at block 628 the method 600 can end. Conversely, if the agriculture operation has not yet concluded, the method 600 can return to block 602, wherein captured information of crop material that is upstream of the agricultural vehicle 100 or header 104 can again be captured. The method 600 can continue to be repeated throughout the course of the agriculture operation such that the header 104, or associated components, can continuously be proactively adjusted with respect to at least one of position or operation of the header 104, or associated components, including, for example, the reel 106, to accommodate for variations in the terrain of the field or the attributes of the crop material located therein.

Figure 7:
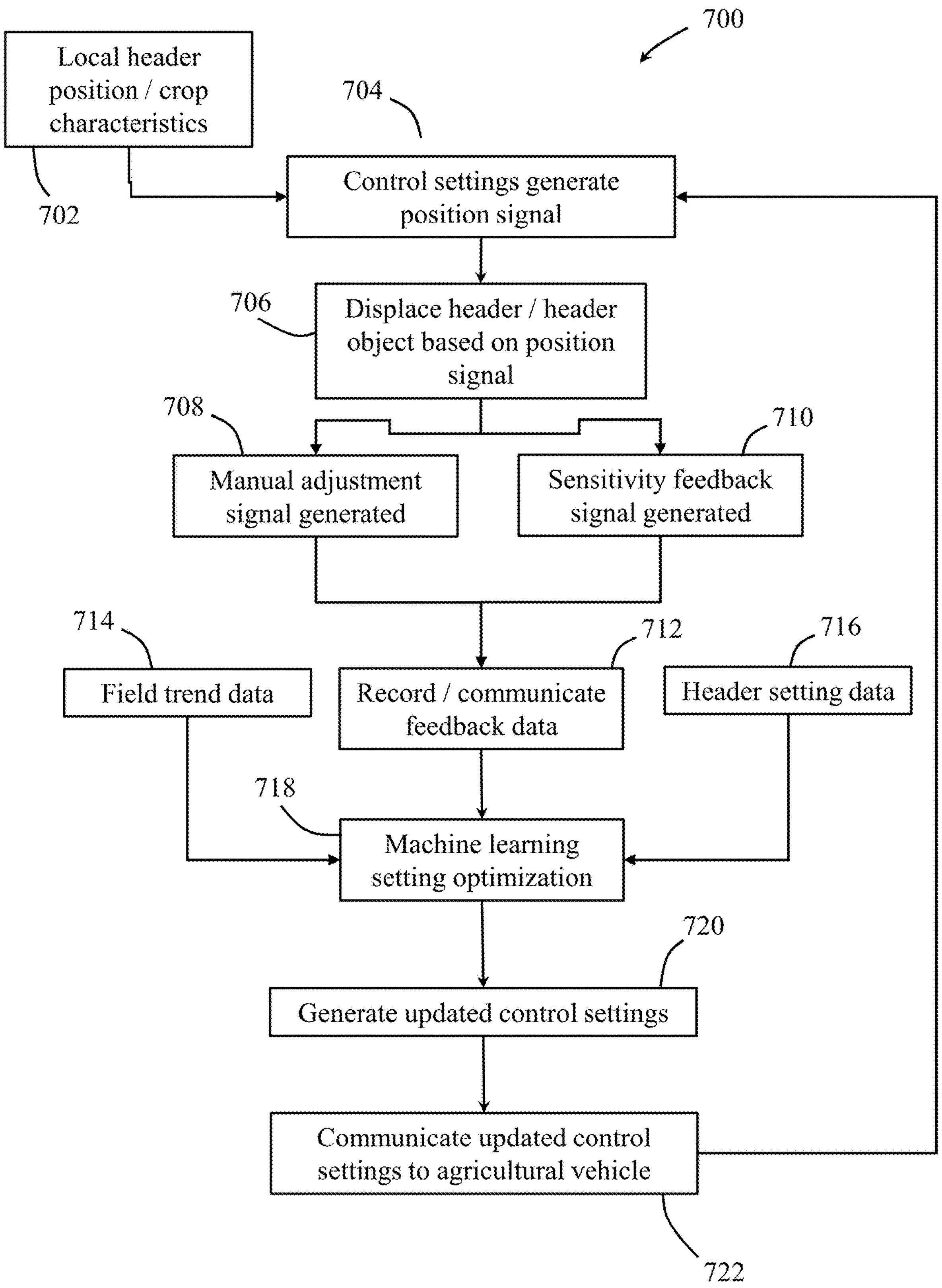
FIG. 7 illustrates a simplified flow diagram of an exemplary method for offline optimization of control settings for positioning at least a portion of a header of an agricultural vehicle.

FIG. 7 illustrates a simplified flow diagram of an exemplary method 700 for offline optimization of control settings for positioning a header 104, or associated components thereof, of an agricultural vehicle 100. Moreover, the method 700 illustrated in FIG. 7 can be utilized at least in part for machine learning to develop or refine the optimization module 184, 200, including the associated model(s) utilized by the optimization module 184, 200. The method 700 is described below in the context of being carried out by the illustrated exemplary header control system 150. However, it should be appreciated that method 700 can likewise be carried out by any of the other described implementations, as well as variations thereof. Further, the method 700 corresponds to, or is otherwise associated with, performance of the blocks described below in the illustrative sequence of FIG. 7. It should be appreciated, however, that the method 700 can be performed in one or more sequences different from the illustrative sequence. Additionally, one or more of the blocks mentioned below may not be performed, and the method 700 can include steps or processes other than those discussed below.

In the exemplary embodiment of the method 700 depicted in FIG. 7, at block 702 the position of the header 104, or one or more associated components the header 104, as well as attributes of the crop material can be determined. Such determinations of positional information and crop material attributes at block 702 can performed in a manner similar to that discussed with respect to at least blocks 602, 604, 606, 608, 610, and 612 of FIG. 6. Further, similar to the use of the optimization module 184 discussed above with respect to block 616 of FIG. 6, the optimization module 184 can, at block 704 of FIG. 7, use at least the information provided by block 702 to generate control settings for adjusting a position of the header 104 or a component (also referred to herein and in FIGS. 6-8 as header object) of the header 104. Further, similar to at least block 618 of FIG. 6, at block 706 of FIG. 7 the control settings generated at block 704 can be implemented at block 706. For example, at block 706, the controller 152 can issue one or more signals for operation of one or more actuators 180 to adjust a position of the header 104 or at associated component of the header 104, including, for example, the reel 106. The control settings generated by operation of the optimization module 184 can, at least during early stages of use of the header control system 150, can be based on an initial, preset model(s) or algorithm(s) for the optimization that can, over time, be refined via use of machine learning, as discussed below.

Additionally, similar to at least block 624 of FIG. 6, at block 708 of FIG. 7 the operator can, via use of an input device 164, manually adjust the setting that was implemented at block 706. For example, as previously discussed with respect to the method 600 in FIG. 6, at block 708, an operator can use the input device 164 to manually adjust a height of the header 104 or reel 106, the fore/aft position of the reel 106, or speed of the reel 106, among other adjustments to the header 104 and the associated components of the header 104.

At block 710, the operator can use the input device 164 to adjust a sensitivity of the header control system 150. For example, as previously discussed, the distance ahead of the header 104 or agricultural vehicle 100 at which the header control system 150 is evaluating the terrain or crop material attributes for changes or variations that may result in a change in position or operation of the header 104, or of an associated component of the header 104, can be a function of the speed at which the agricultural vehicle 100 is traveling. According to certain embodiments, different ranges of speed can be associated with different zones or areas of crop material or terrain upstream of direction of travel of the agricultural vehicle 100. With such an embodiment, each zone or area of crop material or terrain upstream of the agricultural vehicle 100 can correspond to a different distance away from the agricultural vehicle 100, as well as a different speed or range of speeds of travel of the agricultural vehicle 100. Thus, for example, a first zone that is positioned generally adjacent to the header 104 or agricultural vehicle 100 can correspond to a first range of speeds, while another zone that is positioned further away from the header 104 or agricultural vehicle 100 can correspond to another, higher, range of speeds. Thus, when the agricultural vehicle 100 is traveling at a speed that is within the second speed range, the controller 152 will examine information regarding the terrain and crop material attributes of the second area or zone for variances that may necessitate a change in the position or operation of the header 104 or associated components of the header 104.

According to such embodiment, at block 710, an operator can adjust the sensitivity of the header control system 150, at least in part, by adjusting one or more of: the range of speed associated with one or more of the zones; the distance one or more zones are away from the agricultural vehicle 100 or header 104; or a size, such as, for example a length, of one or more of the zone(s) in direction that is generally parallel to the direction of travel of the agricultural vehicle 100. Such adjustments can impact the time the header control system 150 has to identify one or more variances in either or both the terrain of the ground or crop material attributes, determine an appropriate adjustment to a control setting(s), and implement that adjusted setting before the agricultural vehicle 100 or header 104 reaches ground or crop material having the identified variance. Moreover, such adjustments to the sensitivity of the header control system 150 can adjust the time allotted for delays in at least the identification and implementation of adjustments that can be attributed to inherent system latencies of the header control system 150.

The changes identified at block 708 and block 710 can be recorded, such as, for example, via the feedback module 186, 202, and, to the extent not yet communicated, communicated to the secondary device 192. Further, while blocks 702, 704, 706, 708, and 710 have been discussed with respect to operation of a particular, local agricultural vehicle 100, similar information can also be recorded for a plurality of other agricultural vehicles 100 that may be located at other locations, including agricultural vehicles 100 that can be owned or operated by different operators. For example, information similar to that discussed above with respect to block 702, 704, 706, 708, and 710, can be obtained at block 714 for a plurality of other agricultural vehicles 100 using similar header control systems 150 or optimization modules 184, and communicated to the secondary device 192, such as, for example, via use of the network 160. Such acquiring of data by the secondary device 192 from a plurality of agricultural vehicles 100 can be utilized to analyze the accuracy of the optimization models 182, 200, and moreover, utilized in connection with the machine learning of the optimization model 200 at the secondary device 192. Thus, for example, variations between the control settings generated by the optimization module 186 of the associated agricultural vehicles 100 and the corresponding adjustments made, if any, by operators of those agricultural vehicles 100 to those control settings, as well as other information that may be provided by the associated sensor systems 168, can be utilized by a neural network 190 of an AI engine 188 at the secondary device 192 to identify patterns or discrepancies in the outcomes provided by the model(s) or algorithm(s) of the optimization models 186 of those agricultural vehicles 100. With such an offline embodiment, as depicted in FIG. 7, such identified patterns or discrepancies can, at block 718, be utilized to adjust or refine the model(s) or algorithm(s) of the optimization model 200 at the secondary device 192.

Additionally, the offline machine learning for the optimization module 200 that occurs at block 718 can also utilize a variety of additional information in addition to, or in lieu of, the information illustrated by blocks 712 and 714. For example, according to the illustrated embodiment, in addition to the information provided at blocks 712 and 714, other header setting data 716 can also be provided for the machine learning that can occur at block 718. For example, other header 104 related settings data provided at block 718 can relate to preselected operator settings that may be set based on user preferences. Such preset settings can correspond to one or more crop material cut heights preselected by an operator, each cut height corresponding to a presence or identification by the controller 152 of a different, or particular, crop material attribute.

Accordingly, the offline machine learning performed at block 718 for the model(s), including algorithm(s), of the optimization module 200 using at least the inputted information from one or more of blocks 712, 714, and 716, can result in the generation of updated control settings for the optimization module 200, as indicated at block 720. The updated control settings can be recorded by the secondary device 192, such as, for example, by either or both the optimization module 200 and the database 204. Additionally, at block 722, the updated control settings, and, moreover, the updated model(s), including algorithm(s), of the optimization module 200, can be communicated via the communication units 158, 206 and network 160 to the controller 152 of the agricultural vehicle 100. For example, the updated control settings can be provided as a software update for the optimization module 184 of the controller 152 of the agricultural vehicle 100.

The method 700 depicted in FIG. 7 can generally continuously be repeated such that the additional data associated with one or more of blocks 712, 714, and 716, among other data, can continue to be utilized to further refine, or improve the accuracy of, the model(s), including algorithm(s), utilized by the optimization module 200 for the control settings. Further, according to such an embodiment, as the optimization module 200 continues to be updated, including, refined, via machine learning, the updates to the optimization module 200 can at least periodically be communicated for updating the optimization module 184 at the agricultural vehicle 100.

Figure 8:
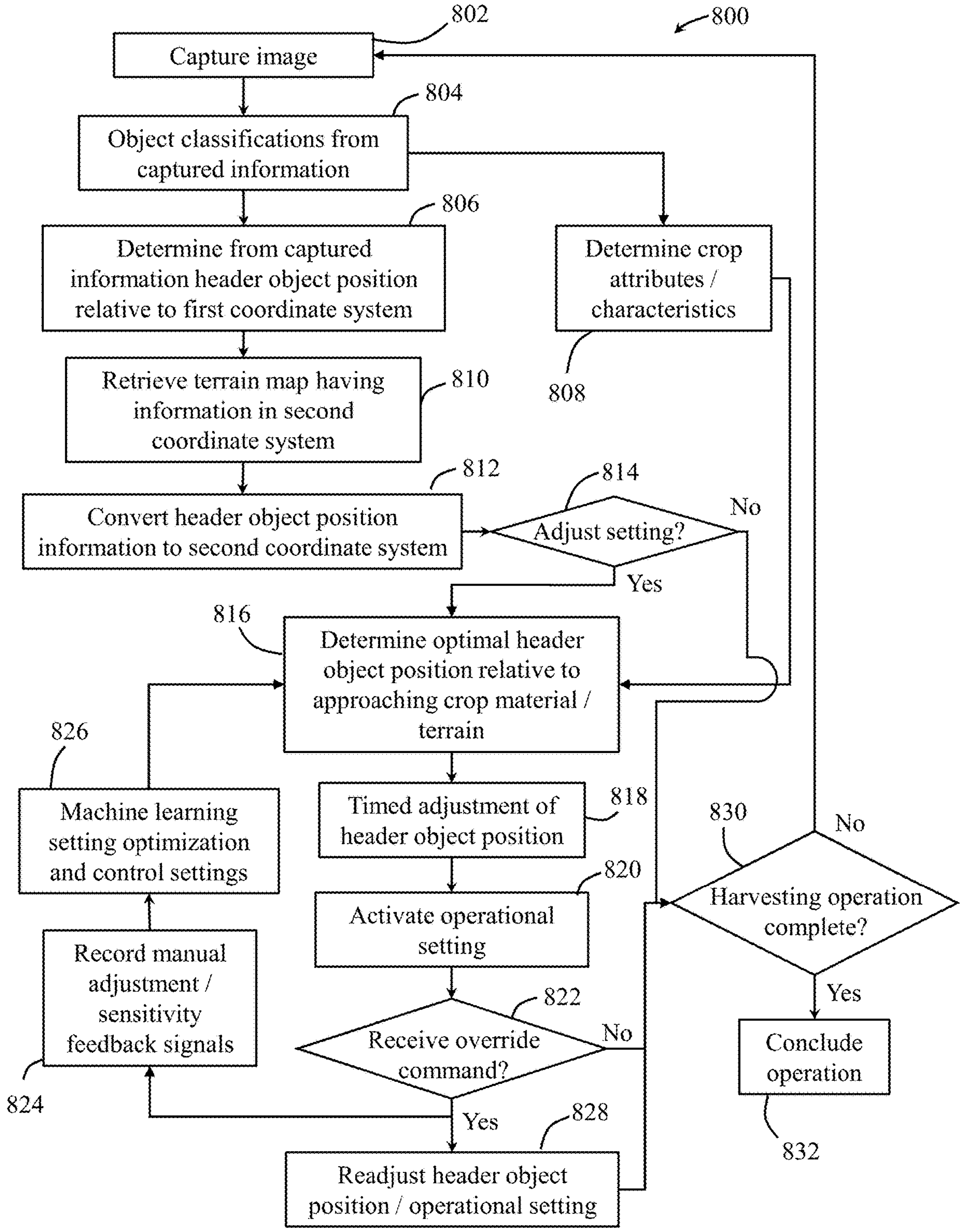
FIG. 8 illustrates a simplified flow diagram of an exemplary method for adjusting a position of at least a portion of a header of an agricultural vehicle that includes online machine learning for optimization of control settings.

FIG. 8 illustrates a simplified flow diagram of an exemplary method 800 for adjusting a position of a header 104, or associated component of the header 104, of an agricultural vehicle 100 that includes online machine learning of optimization of control settings. The method 800 is described below in the context of being carried out by the illustrated exemplary header control system 150. However, it should be appreciated that method 800 can likewise be carried out by any of the other described implementations, as well as variations thereof. Further, the method 800 corresponds to, or is otherwise associated with, performance of the blocks described below in the illustrative sequence of FIG. 8. It should be appreciated, however, that the method 800 can be performed in one or more sequences different from the illustrative sequence. Additionally, one or more of the blocks mentioned below may not be performed, and the method 800 can include steps or processes other than those discussed below.

FIG. 8 illustrates a variation of the method 600 depicted in FIG. 6, wherein the method 800 shown in FIG. 8 further includes machine learning for the optimization module 184 that occurs online, and, more specifically, at the agricultural vehicle 100. Thus, unlike the offline machine learning for the optimization module 200 discussed above with respect to the method 700 illustrated in FIG. 7, the machine learning discussed below with respect to the method 800 shown in FIG. 8 occurs online, and, moreover, at the agricultural vehicle 100. Alternatively, according to other embodiments, the online machine learning that can occur at the agricultural vehicle 100 for the associated optimization module 184 can, according to certain embodiments, be part of the information that is inputted to block 718 of the method 700 shown in FIG. 7, and utilized in connection with machine learning that can occur for the optimization module 200 at the secondary device 192.

In view of the foregoing, blocks 802 through 822 shown in FIG. 8 generally correspond to blocks 602 through 622, respectively, in FIG. 6. Thus, at least the above disclosure for blocks 602 through 622 in FIG. 6 also applies, and is incorporated herein, to blocks 802 through 822, respectively, for the method 800 depicted in FIG. 8. Similarly, at least the above disclosure relating to blocks 624, 626, and 628 also applies, and is incorporated herein, to blocks 828, 830, and 832, respectively, for the method 800 shown in FIG. 8. However, as mentioned above, unlike the method 600 depicted in FIG. 6, the method 800 shown in FIG. 8 provides for online learning for the optimization module 184, and, more specifically, for further development or refinement of the model(s), including algorithm(s), utilized by the optimization module 184 to generate the control settings.

More specifically, the controller 152 can determine at block 822 whether a signal, such as, for example, an override signal or other manual adjustment, has been received from the operator via operation of an input device 164 that changes or adjusts a control setting (a) that was/were generated by the optimization module 182 of the agricultural vehicle 100 at block 816, or an operational setting that was provided at block 820, such as, for example, a speed of rotation for the reel 106. If the controller 152 determines at block 822 that such a signal(s) has been received from the input device 164, then at block 824 the controller 152 can record such an adjustment(s), including, for example, via the feedback module 186. Such recorded information can include an identification of not only an adjustment(s) being made by the operator, but also the extent of the adjustment(s) or the setting(s) resulting from the adjustment(s), among other information. Further, such adjustments by the operator can also include adjustments with respect to the sensitivity of the header control system 150. For example, the feedback module 186 can record operator adjustments that may impact the amount of time allotted to account for inherent system latencies of the header control system 150 to making adjustments in response to determined variations in the terrain or crop material attributes, as previously discussed.

At block 826, the recorded adjustments or changes in the sensitivity of the header control system 150 can be utilized in connection with the machine learning for the optimization module 184 at the agricultural vehicle 100. Thus, similar to the blocks 718 and 720 of the method 700 depicted in FIG. 7, the feedback information provided from block 824 can be utilized by a neural network 190 of an AI engine 188 to identify patterns or discrepancies that can be used for machine learning, and, more specifically, to modify or further refine the model(s), including algorithm(s), utilized by the optimization module 184 for generation of the control settings. The updates generated at block 826 from the machine learning can then be later used at block 816 in connection with generating positional adjustments for at least the header 104, or associated components of the header 104, in response to identified variances in the terrain of the ground or attributes of the crop material, as previously discussed.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for adjusting a position of at least a portion of a header of an agricultural vehicle, the system comprising:

at least one optical sensor positioned to obtain captured information of at least the header;

at least one processor;

a memory device coupled to the at least one processor, the memory device including instructions that when executed by the at least one processor cause the at least one processor to:

classify one or more features detected in the captured information without use of fiduciary markers to identify one or more objects represented in the captured information, the one or more objects comprising at least a portion of the header;

determine, using at least the captured information, a position of at least the portion of the header relative to at least one attribute of an upstream crop material or a ground surface of a field upon which the agricultural vehicle performs an agricultural operation;

determine, for a location upstream of the agricultural vehicle, a variance in a position of at least the portion of the header relative to a position of the at least one attribute of the upstream crop material or the ground surface;

determine, based on the variance, one or more adjusted control settings to adjust the position of the portion of the header relative to the position of the at least one attribute of the upstream crop material or the ground surface; and adjust, based on the one or more adjusted control settings, the position of the portion of the header before, or upon, the header being displaced to a location at which the header encounters the variance in the at least one attribute of the upstream crop material or the ground surface.

2. The system of claim 1, wherein the memory device further includes instructions that when executed by the at least one processor cause the at least one processor to determine, at least in part, the location upstream of the agricultural vehicle as a function of a speed of travel of the agricultural vehicle.

3. The system of claim 1, wherein the memory device further includes instructions that when executed by the at least one processor cause the at least one processor to:

determine, using at least the captured information, the position of the one or more objects relative to a first coordinate system;

convert the position of the one or more objects from the first coordinate system to a second coordinate system used for a terrain map of a field upon which the agricultural vehicle performs an agricultural operation; and determine, using the second coordinate system and for the location upstream of the agricultural vehicle, the variance in the position of at least the portion of the header relative to the position of the at least one attribute of the upstream crop material or the ground surface.

4. The system of claim 1, wherein the memory device further includes instructions that when executed by the at least one processor cause the at least one processor to record as a feedback signal a signal from an input device that changes the position at which the portion of the header was placed based on the adjusted control settings.

5. The system of claim 4, wherein the one or more adjusted control settings are determined using one or more optimization models, and wherein the one or more optimization models are adapted to be refined by machine learning that at least considers information provided by the feedback signal.

6. The system of claim 5, further comprising an artificial intelligence engine having a neural network that is configured to refine, using at least the feedback signal, the one or more optimization models to generate one or more updated optimization models.

7. The system of claim 6, wherein the artificial intelligence engine is located at a secondary device, and wherein the secondary device receives a plurality of other feedback signals from a plurality of other agricultural vehicles, the neural network being further configured to use the plurality of other feedback signals to generate one or more updated optimization models.

8. The system of claim 1, wherein the portion of the header comprises a reel, and wherein the adjusted control settings adjust at least one of a reel height and a longitudinal position of the reel.

9. The system of claim 8, wherein the at least one attribute of the upstream crop material is at least one of a crop material height, crop orientation, or a crop material posture.

10. The system of claim 9, wherein the memory device further includes instructions that when executed by the at least one processor cause the at least one processor to identify, from the captured information, the at least one attribute of the upstream crop material, and determine the adjusted control settings based in part on the at least one attribute of the crop material.

11. A method for adjusting a position of at least a portion of a header of an agricultural vehicle, the method comprising:

capturing, by at least one optical sensor, captured information of the header and a crop material positioned upstream of the agricultural vehicle;

classifying one or more features identified in the captured information without use of a fiduciary marker to identify one or more objects represented in the captured information, the one or more objects comprising at least a portion of the header;

determining, using at least the captured information, a position of at least the portion of the header relative to at least one attribute of an upstream crop material or a ground surface of a field upon which the agricultural vehicle performs an agricultural operation;

determining, for a location upstream of the agricultural vehicle, a variance in a position of at least the portion of the header relative to the at least one attribute of the upstream crop material or the ground surface;

determining, based on the variance, one or more adjusted control settings to adjust the position of the portion of the header relative to the position of at least one of the at least one attribute of the upstream crop material or the ground surface; and adjusting, based on the one or more adjusted control settings, the position of the portion of the header before, or upon, the header being displaced to a location at which the header encounters the variance in at least one of the of the at least one attribute of the upstream crop material or the ground surface.

12. The method of claim 11, further comprising determining, at least in part, the location upstream of the agricultural vehicle as a function of a speed of travel of the agricultural vehicle.

13. The method of claim 11, further comprising:

determining, using at least the captured information, the position of the one or more objects relative to a first coordinate system;

converting the position of the one or more objects from the first coordinate system to a second coordinate system used for a terrain map of a field upon which the agricultural vehicle performs an agricultural operation; and determining, using the second coordinate system and for the location upstream of the agricultural vehicle, the variance in the position of at least the portion of the header relative to the position of the at least one attribute of the upstream crop material or the ground surface.

14. The method of claim 11, further comprising recording, as a feedback signal, a signal from an input device that changes the adjusted position of the portion of the header.

15. The method of claim 14, wherein determining the one or more adjusted control settings comprises determining the one or more adjusted control settings using one or more optimization models, and wherein the method further comprises refining the optimization models by machine learning that at least considers information provided by the feedback signal.

16. The method of claim 15, wherein refining the optimization models comprises a neural network of an artificial intelligence engine using at least the feedback signal to generate one or more updated optimization models.

17. The method of claim 16, wherein the artificial intelligence engine is located at a secondary device, and wherein the method further includes the secondary device receiving a plurality of other feedback signals from a plurality of other agricultural vehicles, and the neural network refining the optimization models using, at least in part, information provided by the plurality of other feedback signals to generate the one or more updated optimization models.

18. The method of claim 11, wherein the portion of the header comprises a reel, and wherein the adjusted control settings adjust at least one of a reel height, a longitudinal position of the reel, or a speed of a reel.

19. The method of claim 18, wherein the variance in the position is a change in at least one of a crop material height or a crop material posture.

20. The method of claim 19, further comprising identifying, from the captured information, the at least one attribute of the crop material, and determine the adjusted control settings based in part on the at least one attribute of the upstream crop material.

* * * * *